Oct. 15, 1940.  R. D. NYE  2,217,808
METHOD OF CONVERTING FURNACE SLAG INTO GLASSLIKE COMPOSITION
Filed Aug. 26, 1937
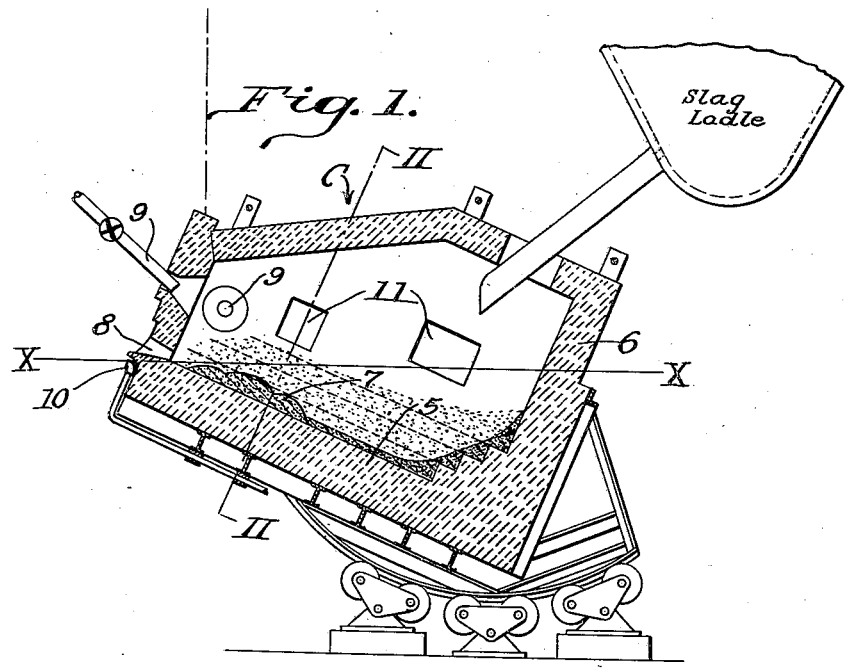
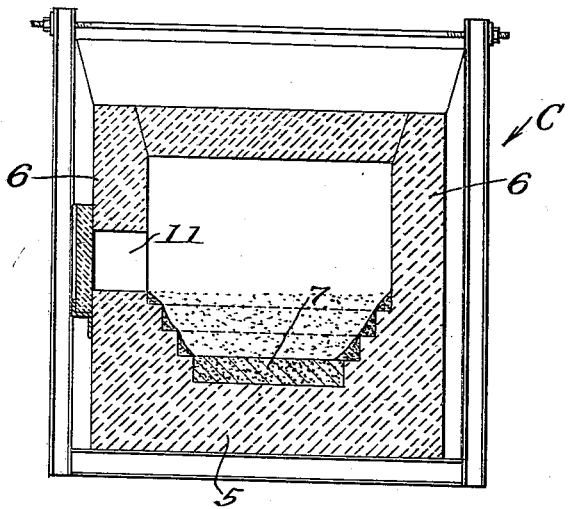
Inventor
Ralph D. Nye
By W. D. McLlowell
Attorney Patented Oct. 15, 1940

2,217,808

UNITED STATES PATENT OFFICE 2,217,808

METHOD OF CONVERTING FURNACE SLAG INTO GLASSLIKE COMPOSITION

Ralph D. Nye, Columbus, Ohio

Application August 26, 1937, Serial No. 161,102

4 Claims. (Cl. 49—77.5)

The object of this invention is to provide a practical and economical method of transforming ordinary blast furnace slag into a substantially vitreous glass or glasslike material, such material having a wider utility in the industrial arts and higher commercial value than the slag from which it is primarily formed.

It has been proposed in the art of utilizing furnace slag to add silica to slags of standard compositions for the purpose of increasing the silica content thereof sufficiently to form vitreous glasslike compounds suitable for the production of mineral wool and other useful products. While this general theory is well understood, yet the practical attainment of the end sought presents many problems difficult of solution from the standpoint of an economical commercial operation.

Foremost among these problems is the difficulty in obtaining rapid and uniform chemical reactions between the added or free silica and a body of molten slag. Silica possesses a high fusion point and its specific gravity is such that if it is directly introduced into a pool of molten slag in a free state, it will tend to float on the top of or become separated from the pool without sensibly entering into chemical union therewith. In order for silica to combine with slag, it must be transformed chemically into a polysilicate or rendered dissolvable in the molten slag. This result is not practically attainable by attempting to mechanically mix finely divided silica with the molten slag, as the silica may rise to the top of the slag pool and may not be converted into the silicate form for dissolution in the slag.

Another difficulty of practical importance is the matter of the protection of the walls and bottom lining of the vessel in which the reactions between the slag and silica take place against erosion and other disintegrating or destroying action of the highly heated slag. Most of these linings contain silica and since its slag composition has an excess of basic oxides, these readily unite with the available acidic silica from them causing damaging erosion and premature deterioration of the reaction or converter chamber walls, by forming silicates. It is practically impossible to protect the bottom lining by attempting to mix finely divided silica intimately with molten slag.

The object of the present invention is to provide, among other desiderata, for the practical solution of these problems by the provision of the novel method and/or means by which the bottom and side walls of the converting chamber are provided with a lining composed of siliceous material in a solidified coherent state, and which lining is adapted to provide the sole source of supply for the silica which is chemically combined with the molten furnace slag introduced into the chamber, to the end that the heated furnace slag contacting with the siliceous surfaces of the solidified coherent lining will take up in chemical combination from said lining the required amounts of silica, as contra-distinguished from prior processes involving the introduction and mechanically mixing of free silica in a pool of molten slag.

Another object of the invention is to provide a method of increasing the silica content of molten furnace slag by causing the slag to chemically combine with silicates released from the lining walls only of the converting chamber.

A further object rests in so arranging the bottom and side walls of the converting chamber that added quantities of silica may be applied thereto to replace that lost through chemical union with the slag, the added silica becoming sintered on the heated surfaces of the lining walls to maintain its solid coherent form and to prevent any tendency thereof to float to the surface of the slag subsequently introduced into the chamber.

For a further understanding of the invention, reference is to be had to the following description and the accompanying drawing, wherein:

Fig. 1 is a vertical sectional view taken through a furnace or converter of a type suitable for the purposes of the present invention;

Fig. 2 is a vertical transverse sectional view taken through the furnace or converter on the plane indicated by the line II—II of Fig. 1.

Blast furnace slag consists principally of lime, magnesia, alumina and silica, together with minor portions of sulphur and iron oxide. These slags are often disposed of as waste materials, or they may be crushed or otherwise broken up and adapted for various industrial purposes. It is well known that such slags, as discharged from the furnace, if allowed to cool and bulk, will crystallize and solidify into stone or rock-like material. Also it is known that glass is formed by vitrification of proper chemical compounds which solidify into amorphous material upon cooling.

The present invention embodies the taking of molten slag as discharged by the blast furnace and, by the addition thereto of silica or other minerals in a novel and effective manner, converting such slag into proper chemical compounds which may be formed into glass, or other glasslike composition. This modification and conversion is accomplished in a vessel C which may be termed the converter, the latter comprising a furnace which may be stationary, or preferably one which can be tilted to control discharge of its contents. The converter C is lined with refractory material and heat is developed therein in a manner to render the same effective in causing the desired chemical reactions.

Since glass is formed by combining the acidic oxides of silica with certain basic oxides, such as lime, magnesia, alumina, soda and/or potash, in various proportions to form different grades and qualities, it is possible to convert blast furnace slag into glass by causing the slag to unite with the proper amounts of silica, and other minerals as required. Most blast furnace slags contain a larger proportion of lime, magnesia and alumina than of silica, and therefore the principal mineral to be added, in order to cause the resulting mixture to vitrify, is silica, since an excess of silica is generally required in the mixture from which glass is formed.

Therefore, the converter C is equipped with a lining having its bottom and sides 5 and 6, or other surfaces which come into contact with the slag, made of siliceous material, the said bottom and sides being arranged so that silica may be added to them at desired intervals to replace the amounts of silica which unite with the slag. To permit of the convenient addition of silica to the sides of the converter, the latter are sloped gradually upwardly from the bottom 5, so that silica sand may be thrown upon them, the sand remaining in place at the natural angle of repose for the material and becoming attached to the side walls by the sintering or cementing action of the high converter temperatures. Also, in order to promote rapid combination of silica with the excess of lime, magnesia and alumina, that are present in the slag, a wall or dam 7 of silica sand is constructed on the bottom of the converter contiguous to its outlet 8, the said wall or dam being so positioned that the molten slag must flow over it when discharged from said converter by way of its outlet.

The fire from the burner 9, employed in heating the converter, is largely directed upon the dam or wall 7, so that the temperature of the latter is raised to a relatively high point, for instance 1400 or 1500° C. By being thus heated, the silica contained within said wall or dam will readily combine with the lime or magnesia remaining in the slag. As the silica is taken up from this wall or dam, it is easily replaced by simply shoveling more silica sand onto it wherever erosion has taken place, during inactive intervals of converter operation, this being occasioned by successive charges of the slag from an associated blast furnace, or other form of smelter.

Since the molten slag is delivered intermittently by the blast furnace, it is charged to the converter periodically and thus the converter operation becomes periodic, that is, the converter having its bottom and side wall banks made up of siliceous material, and a silica sand dam having been constructed in front of the converter outlet, and the internal temperature raised to about 1400 or 1500° C., the said converter is ready to receive the molten slag from the blast furnace. Thus we take advantage of the normal periodic action of the blast furnace in discharging molten slag for the purpose of renewing the silica sand lining and silica sand dam of the converter, and in effect make the entire operation continuous in unison with the periodic action of the associated blast furnace.

By referring to Fig. 1 of the drawing, showing the tiltable converter, it is evident that by having the discharge outlet 8 thereof raised or tilted above the horizontal plane X—X, a chamber is formed interiorly of the converter into which the molten slag, from the blast furnace or other point of supply, may be run or poured. This chamber has its sides and bottom prepared principally from silica. Into this pot or crucible such other materials as required may be placed. These added minerals may consist of mixtures of sodium and silica, potash and silica or the like. When these additions to the chamber are melted, the molten slag is flowed into them and the chamber filled until the desired amount of slag has been charged to the converter. The basic oxides in the slag will unite chemically with the acidic silica and also the heated silica crystals, comprising the converter lining will dissolve into the molten mass.

It will be evident that when the outlet of the tiltable vessel is lowered to a discharge position, the molten slag will flow over the silica sand dam, placed in front of the outlet, and more silica will be dissolved until the basic oxides have been saturated with the acidic silica oxides Also crystals of silica from this wall or dam will dissolve into the molten mixture as it flows over the same in a thin layer or sheet, the action being assisted by the fire directed from the burner on the silica sand dam. As the proportions of this dam can be made very large compared to the size of the outlet of the converter, and since the rate of flow over the dam can be controlled by varying the angle of tilt, it is apparent that through this arrangement, the final mix and composition of the slag may be controlled.

After the molten material has been discharged from the tiltable converter, its outlet is again raised and necessary additions of silica sand are made to its bottom, the side banks and the dam or wall. Also whatever additional minerals may be required are then placed in the chamber and melted in preparation for the next charge of molten slag or sand from the blast furnace. In this manner, the lining of the converter is renewed as rapidly as it is being taken up by the slag which is being processed and thus the life of the linings may be considered as practically permanent when properly renewed between charges of the slag.

The beneficial effect of the additions of silica to the molten slag are manifold. When the slag has a large proportion of lime, magnesia and alumina, its softening and flowing temperature is high. By adding silica to it, the melting temperature of the new mixture may be reduced. Any reduction in melting temperature results in a saving of fuel and reduction in loss of refractories used as the converter lining. When the slag becomes saturated with silica, it will not attack the siliceous lining of the converter and thus the life of these linings is lengthened.

Having obtained a composition which may be more readily melted, the viscosity thereof is lowered at any given temperature, and thus the flow of the composition through the converter outlet may be more easily controlled. The molten material discharged from the converter outlet may be subject to the action of a steam jet or air blast for the purpose of shredding the molten material into glass or mineral wool or, if desired, the molten material may be introduced into molds for the molding or shaping of articles of glass. In fact, the material may be placed to any of the industrial operations common to glass manufacture. The amount of silica to be added to the furnace slag will of course vary with the desired composition of the end product. If the desired end product happens to be glass wool, I prefer to add sufficient silica so that the composition of the end product possesses silica in amounts from 15% to 20% greater than the lime and magnesia content of the final material. These proportions are given by way of illustration and not in a limiting sense.

From the foregoing, it will be seen that the present invention provides a method and means for effecting a thorough chemical union of added quantities of silica to ordinary blast furnace slag, thus raising the silica content of such slag to proportions adapting the slag, or the new converted material, to uses in which common glass is now employed. Particularly, the present invention provides for the combining of the slag with silica obtained entirely from the bottom and side wall construction of the lining comprising the converter chamber. The silica at all times remains in a coherent agglomerate mass, devoid of free particles which would tend to float to the surface of the slag pool. Under the temperatures of the converter chamber (1500° C.), silica forms silicates and dissolves into the molten slag in the form of a polysilicate and readily enters into chemical union therewith, the ebullient action of the heated slag causing sufficient agitation of the latter to bring the entire body thereof into intimate contact with the siliceous lining. Free silica added to the lining for replacement purposes sinters or cements itself on the adjoining lining surfaces so that the desired coherency between the silica particles takes place. By this procedure, all silica added to the slag is taken up from the converter walls, as distinguished from a mere mechanical mixing action.

When the temperature of the molten slag is raised within the converter, and particularly as it flows over the silica wall or dam indicated at 7, the chemical substances present in the slag will tend to dissociate into their constituent oxides under the temperatures utilized. The free oxides of aluminum, calcium and/or magnesium, which are thus caused to exist, will tend to unite with the silica and form the metal solutions of various silicates which may be formed into glass by subsequent cooling to prevent the creation of crystals. Thus it is evident that by subjecting the molten slag to sufficiently high temperature, particularly as it flows in a thin layer or coating over the silica wall or dam, the process of dissociation is employed to promote and expedite the addition of silica to the molten slag. As most blast furnace slags contain only 35% to 45% silica, and since glass requires ordinarily 65% to 75% of silica in its content, it is evident that the use of this process of dissociation in order to secure a rapid addition of the silica to the slag is of outstanding importance.

The silica fettling, which is added from time to time to the furnace chamber, protects the refractory walls of the chamber from deterioration and at the same time provides the desired source of silica for addition to the molten slag. Upon the discharge of the molten glasslike composition from the chamber, the same may be received within molds in order to be cast into articles of desired formation or, as shown, the same may be shredded into fibers, producing a siliceous wool by means of steam or air discharged under pressure from the jet 10, the latter being permanently carried by the furnace or converter C. Openings 11 are provided in the side walls of the converter, providing for the convenient addition of the silica fettling from time to time.

What is claimed is:

1. The method of converting blast furnace slag of relatively low silica content into a glasslike material of higher silica content, the steps which comprise introducing ordinary blast furnace slag in a molten state into a converting chamber having the walls and bottom thereof lined with a siliceous fettling, and maintaining the slag in said chamber for a sufficient period of time and under elevated temperatures to effect union of a substantial portion of the silica content of said fettling with said slag, whereby to convert the slag into a glasslike material.

2. The method of converting blast furnace slag of relatively low silica content into a glasslike material of higher silica content, the steps which comprise introducing ordinary blast furnace slag in a molten state into a converting chamber having the walls and bottom thereof lined with a siliceous fettling, maintaining the slag in said chamber for a sufficient period of time and under elevated temperatures to effect union of a substantial portion of the silica content of said fettling with said slag, whereby to convert the slag into a glasslike material, removing the glasslike material from the converting chamber, relining the bottom and side walls of said chamber with new additions of siliceous fettling, and introducing additional quantities of an ordinary blast furnace slag into said chamber following the relining of the walls thereof with the renewed fettling.

3. The method of converting blast furnace slag of relatively low silica content into a glasslike material of higher silica content, the steps which comprise: establishing a pool of molten blast furnace slag of relatively low silica content in the converting chamber of a tiltable furnace, the latter being of the type having a restricted outlet for the discharge of the slag from one end of the furnace, disposing a weir of silica on the bottom of the furnace between the main body of molten slag contained within said chamber and said outlet, directing hot gases of combustion developed by the operation of a fuel burner on said weir, and tilting said furnace bodily to establish a flow in thin sheet-like form of the molten slag from said pool over said weir, whereby to heat the slag and the silica of said weir to temperatures resulting in the chemical union of silica contained in the weir with said slag prior to the discharge of the latter through said outlet.

4. In a method of converting blast furnace slag of relatively low silica content into a glasslike material of higher silica content, the improvement which comprises: introducing a body of molten furnace slag into a converter chamber, establishing a pool of such slag within said chamber with the use of a silica weir, flowing the molten slag from said pool over said weir, and subjecting the slag during its passage over said weir while in a thin sheet-like form to the direct action of a burner flame, whereby to heat said slag sufficiently to effect chemical union of the silica contained in said weir therewith.

RALPH D. NYE.